United States Patent
Lawrence, Sr.

(10) Patent No.: US 7,501,058 B1
(45) Date of Patent: Mar. 10, 2009

(54) SELF-CLEARING STRAINER FOR FLUID INTAKE

(76) Inventor: Joseph W. Lawrence, Sr., 21702 Erie St., Sagertown, PA (US) 16433

( * ) Notice: Subject to any disclaimer, the term of this patent is extended or adjusted under 35 U.S.C. 154(b) by 0 days.

(21) Appl. No.: 12/152,199

(22) Filed: May 12, 2008

Related U.S. Application Data

(60) Provisional application No. 60/928,763, filed on May 11, 2007.

(51) Int. Cl.
  *B01D 35/10* (2006.01)
  *B01D 35/26* (2006.01)
  *B01D 33/067* (2006.01)
  *B01D 33/29* (2006.01)
  *B01D 33/56* (2006.01)

(52) U.S. Cl. ............ 210/232; 210/242.1; 210/354; 210/460; 210/416.1; 210/508

(58) Field of Classification Search ......... 210/232, 210/242.1, 354, 460, 416.1, 508
See application file for complete search history.

(56) References Cited

U.S. PATENT DOCUMENTS

| | | | |
|---|---|---|---|
| 969,364 A | 9/1910 | Grootenhuis | 173/201 |
| 2,022,336 A | 11/1935 | Bower | 210/173 |
| 3,291,313 A * | 12/1966 | Davis | 210/354 |
| 3,448,858 A * | 6/1969 | Mills et al. | 210/354 |
| 3,882,025 A | 5/1975 | Talley, Jr. | 210/354 |
| 4,017,394 A | 4/1977 | Hensley | 210/157 |
| 4,152,264 A | 5/1979 | Hanna, Sr. | 210/170 |
| 4,210,539 A * | 7/1980 | Shiban | 210/391 |
| 4,617,120 A * | 10/1986 | Barzuza et al. | 210/409 |
| 5,215,656 A | 6/1993 | Stoneburner | 210/170 |
| 6,398,038 B1 * | 6/2002 | Fontes | 210/354 |
| 6,508,933 B2 | 1/2003 | Wilkins et al. | 210/170 |

* cited by examiner

*Primary Examiner*—Thomas M Lithgow
(74) *Attorney, Agent, or Firm*—Richard K Thomson

(57) ABSTRACT

A cylindrical tumbler has a plurality of angled slots positioned about its periphery, the leading edge face of each slot forming an angled impeller vane. When the tumbler is placed on an intake plug and suction applied through the plug, the tumbler spins throwing off any debris which may otherwise accumulate on the strainer. In alternate embodiments, lengths of flexible strand can be attached to the periphery of the tumbler or two tumblers with oppositely angled slots, and hence, opposite spin directions can be positioned on the same plug to increase turbulence and further reduce debris accumulation.

7 Claims, 3 Drawing Sheets

20

SELF-CLEARING STRAINER FOR FLUID INTAKE

Applicant claims the benefit of provisional patent appl. No. 60/928,763 filed May 11, 2007.

BACKGROUND AND SUMMARY OF THE INVENTION

The present invention is directed to the field of fluids. More particularly, the present invention is directed to a strainer for a fluid intake which is self-clearing.

The application which gave rise to the present invention relates to fire-fighting. In relation to his duties as a volunteer fire-fighter, Applicant has often experienced clogging of a suction hose placed in a lake or stream intended to enable a pumper truck to utilize riparian water to combat a blaze. In fire fighting, time is of the essence and any delays can result in loss of property and, in some cases, loss of lives. The present invention was developed to cope with the problem or clogged fire hoses. However, it is envisioned that the self-clearing strainer of the present invention has a much broader application including, but not limited to, use with sump pumps, and the like.

Various other features, advantages, and characteristics of the present invention will become apparent after a reading of the following detailed description.

BRIEF DESCRIPTION OF THE DRAWINGS

The preferred embodiment(s) of the present invention is/are described in conjunction with the associated drawings in which like features are indicated with like reference numerals and in which.

DETAILED DESCRIPTION OF THE PREFERRED EMBODIMENT(S)

Figure 1:
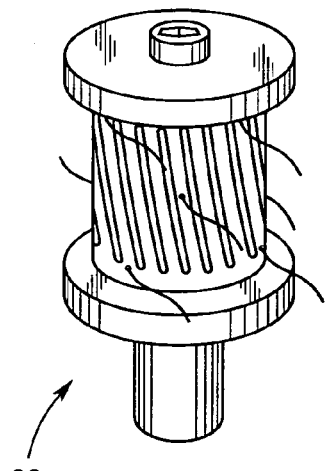
FIG. 1 is a perspective front view of a first embodiment of the self-clearing strainer of the present invention.
Figure 2:
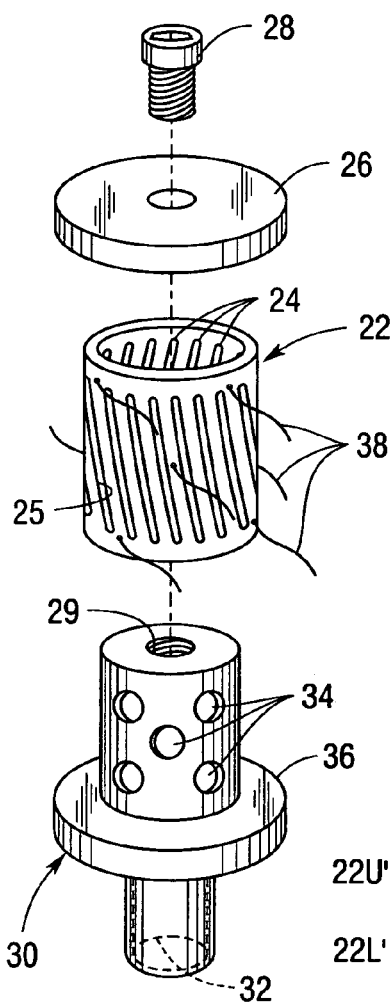
FIG. 2 is an exploded perspective view of the first embodiment.

A first embodiment of the self-clearing strainer of the present invention is depicted in FIGS. 1 and 2 generally at 20. Cylindrical tumbler 22 has a plurality of angled slots 24 cut through its peripheral wall and is mounted on an intake plug 30 that fits in the end of an intake hose (not shown). Intake plug 30 has a throughbore 32, a plurality of laterally extending holes 34 which intersect throughbore 32 and a radial flange or base 36. Cylindrical tumbler 22 is retained in place by a cap 26 and retainer screw 28. The distance between the base 36 of intake plug 30 and cap 26 exceeds the length of the cylindrical tumbler 22 enabling it to turn freely thereon. The leading edge 25 of each slot 24 functions as a vane. When suction is applied to the hose, cylindrical tumbler 22 rotates at a significant rate of speed resisting clogging by throwing any debris out away from its peripheral surface. Depicted in FIGS. 1 and 2 are a plurality of flexible strands 28 (e.g., fishing line) which further serve to keep debris away from the surface of the cylindrical tumbler. The mounting assembly, shown here including retainer screw 28, enables easy removal to clean/replace the tumbler as necessary.

Figure 3:
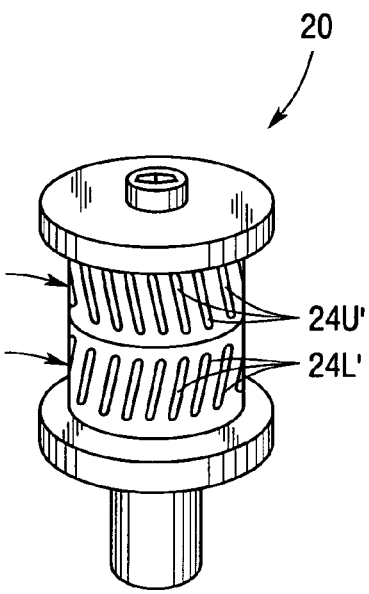
FIG. 3 is a front perspective view of a second embodiment of the present invention.

A second embodiment is depicted in FIG. 3 generally at 20'. Strainer 20' includes two tumblers 22U' and 22L' that are mounted coaxially with slots 24U' and 24L' slanting in opposite directions such that the tumblers rotate in opposed directions. Although not shown, it will be appreciated that a flange between the two tumblers 22U' and 22L' will facilitate their respective rotations. The turbulence induced by such counter rotation further helps to maintain clog-free operation.

Figure 4:
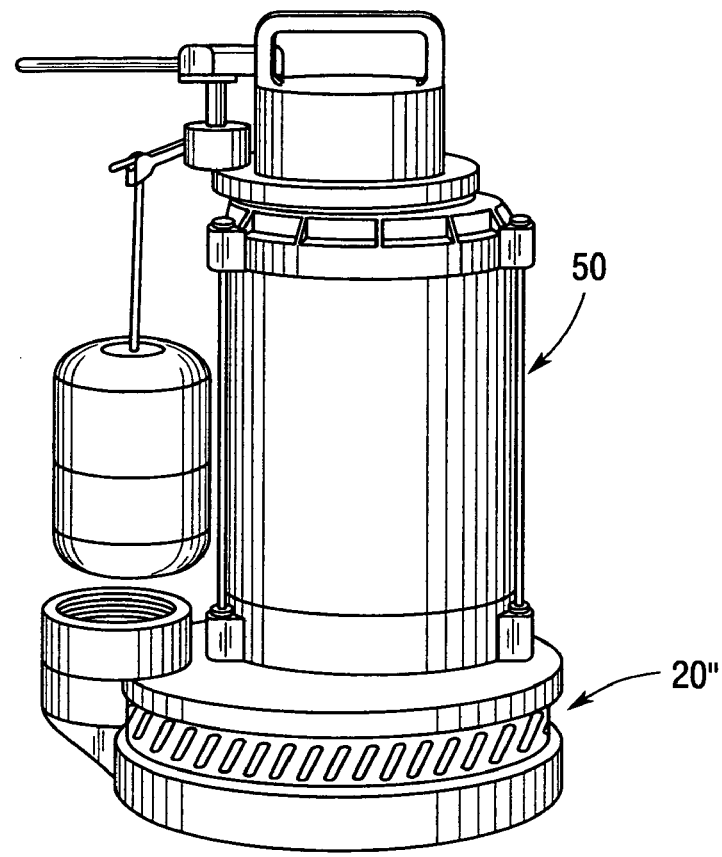
FIG. 4 is a front view of a third embodiment of the present invention.
Figure 5:
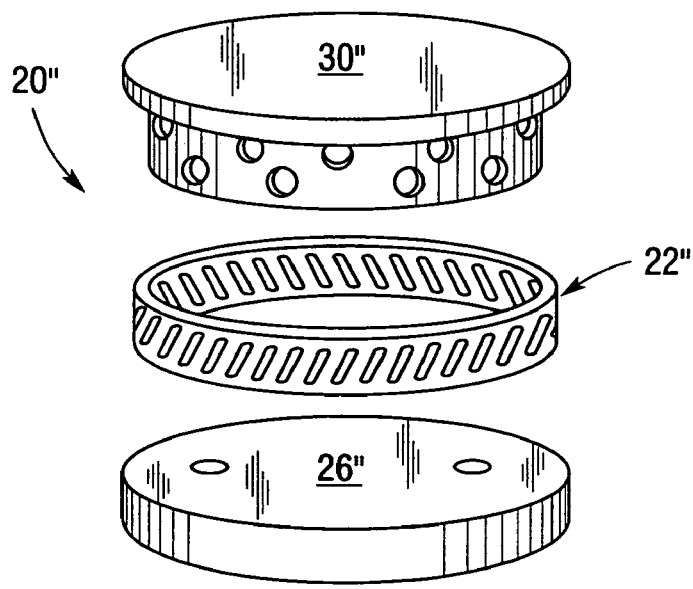
FIG. 5 is an exploded perspective view of the strainer portion of the third embodiment.

A third embodiment of the present invention is depicted in FIG. 4 generally at 20". In this embodiment, self-clearing strainer 20" is assembled on sump pump 50. As shown in FIG. 5 in an exploded view, the diameters of cylindrical tumbler 22", cap 26" (which, in this inverted application, lies beneath tumbler 22") and plug 30" are adjusted to provide a diameter consistent with that of the base 52 of the sump pump 50. As the sump pulls suction through angled slots 24", leading surfaces 25" form impeller vanes causing tumbler 22" to spin throwing off accumulated debris, thereby self-clearing strainer 20".

Figure 6:
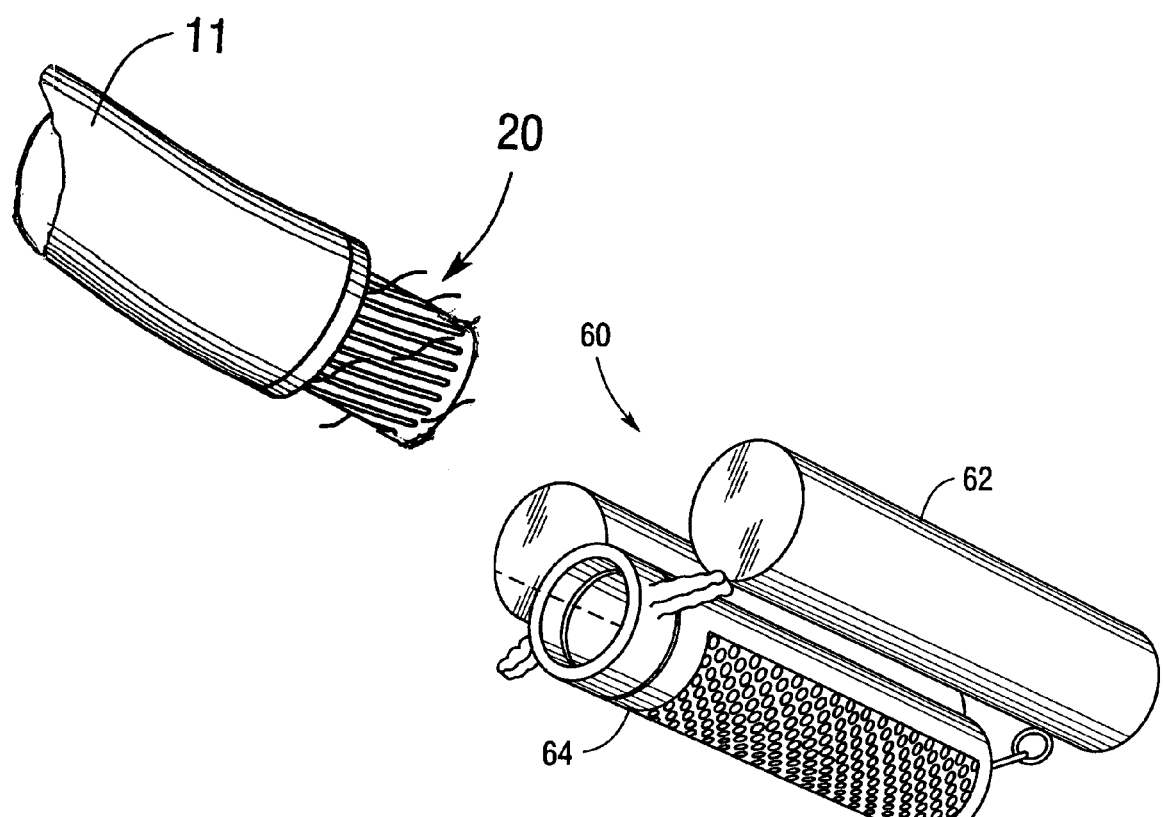
FIG. 6 is an exploded schematic depicting the self-clearing strainer of the present invention employed with a commercially available floating strainer.

As seen in FIG. 6, a floating strainer 60 can be positioned to receive the strainer 20 of the present invention around an external portion of housing 64 which is suspended below a pair of floats 62, should the water conditions suggest that water would more preferably be drawn from near the surface. The self-clearing strainer 20 when attached to a plug 30 in the end of a hose, would normally sink drawing water from below the surface of a lake or near the bottom of a stream or river.

Various changes, alternatives, and modifications will become apparent to a person of ordinary skill in the art after a reading of the foregoing specification. It is intended that all such changes, alternatives, and modifications as fall within the scope of the appended claims be considered part of the present invention.

I claim:

1. A self-clearing strainer assembly for a fluid intake, said strainer assembly comprising:
   a cylindrical tumbler having a cylindrical wall with a first plurality of slanted intake openings passing through said cylindrical wall, a leading edge of each said intake opening forming an impeller vane, mounting means attachable to a first end of the fluid intake enabling said cylindrical tumbler to rotate about its longitudinal axis when suction is applied to an opposite end of the intake,
   whereby water drawn into said self-clearing strainer assembly causes said cylindrical tumbler to rotate thereby throwing off any debris which might otherwise cling to and clog said intake openings in said cylindrical wall.

2. The self-clearing strainer assembly of claim 1 further comprising a second cylindrical tumbler mounted coaxially with said first said cylindrical tumbler, said second cylindrical tumbler having a second plurality of intake openings creating a second plurality of impeller vanes slanted in an opposite angular direction causing said second cylindrical tumbler to rotate in an opposite rotational direction from said first cylindrical tumbler.

3. The self-clearing strainer of claim 1 further comprising a plurality of lengths of flexible strand attached at a plurality of locations about a periphery of said cylindrical wall of said cylindrical tumbler, said flexible strand serving to create turbulence which keeps debris a significant distance from said plurality of intake openings.

4. The self-clearing strainer of claim 1 further comprising a guard placed in proximity to said self-clearing strainer to limit an amount of debris which can access said intake openings.

5. The self-clearing strainer of claim 4 wherein said guard is mounted in a housing which floats above said self-clearing strainer.

6. The self-clearing strainer of claim 1 wherein said mounting means includes quick disconnect attachments which permit said self-clearing strainer to be easily replaced.

7. The self-clearing strainer of claim 1 wherein the fluid intake comprises the intake end of a sump pump.

* * * * *